(12) United States Patent
Uchida

(10) Patent No.: US 10,105,992 B2
(45) Date of Patent: Oct. 23, 2018

(54) PNEUMATIC TIRE

(71) Applicant: The Yokohama Rubber Co., LTD., Minato-ku, Tokyo (JP)

(72) Inventor: Yuta Uchida, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 52 days.

(21) Appl. No.: 15/034,151

(22) PCT Filed: Oct. 27, 2014

(86) PCT No.: PCT/JP2014/078536
§ 371 (c)(1),
(2) Date: May 3, 2016

(87) PCT Pub. No.: WO2015/068605
PCT Pub. Date: May 14, 2015

(65) Prior Publication Data
US 2016/0280012 A1 Sep. 29, 2016

(30) Foreign Application Priority Data
Nov. 6, 2013 (JP) ................. 2013-230607

(51) Int. Cl.
*B60C 11/03* (2006.01)
*B60C 11/00* (2006.01)
(Continued)

(52) U.S. Cl.
CPC ............ *B60C 11/0304* (2013.01); *B60C 5/00* (2013.01); *B60C 11/00* (2013.01);
(Continued)

(58) Field of Classification Search
CPC . B60C 11/0304; B60C 11/00; B60C 11/0083; B60C 11/03; B60C 11/0302; B60C 11/033; B60C 5/00
See application file for complete search history.

(56) References Cited

U.S. PATENT DOCUMENTS 4,722,378 A * 2/1988 Carolla ............... B60C 11/0302
152/209.15
4,840,210 A 6/1989 Kukimoto
(Continued)

FOREIGN PATENT DOCUMENTS

JP   S57-0147901   9/1982
JP   S62-0103205   5/1987
(Continued)

OTHER PUBLICATIONS

International Search Report for International Application No. PCT/JP2014/078536 dated Jan. 27, 2015, 4 pages, Japan.

*Primary Examiner* — Joseph S Del Sole
*Assistant Examiner* — Melody Tsui
(74) *Attorney, Agent, or Firm* — Thorpe North & Western

(57) ABSTRACT

A pneumatic tire includes at least three circumferential grooves extending in a tire circumferential direction in the tread portion, and at least four ribs defined by the at least three circumferential grooves, the at least four ribs extending in the tire circumferential direction. At least two of the ribs including the rib disposed on a first side of a tire equatorial plane in a tire width direction and the rib disposed on a second side protrude to an outer side in a tire radial direction beyond a profile line of a tread surface when viewed in the meridian cross section. The protruding amount decreases in order from the first side in the tire width direction to the second side, and the groove surface area ratio of the tread surface is greater on the second side of the tire equatorial plane in the tire width direction than on the first side.

11 Claims, 10 Drawing Sheets

(51) Int. Cl.
*B60C 11/13* (2006.01)
*B60C 5/00* (2006.01)

(52) U.S. Cl.
CPC .......... *B60C 11/0083* (2013.01); *B60C 11/03* (2013.01); *B60C 11/0302* (2013.01); *B60C 11/033* (2013.01); *B60C 11/0332* (2013.01); *B60C 11/1376* (2013.01); *B60C 2011/0334* (2013.01); *B60C 2011/0341* (2013.01); *B60C 2011/0386* (2013.01)

(56) References Cited

U.S. PATENT DOCUMENTS

| | | |
|---|---|---|
| 4,905,748 A | 3/1990 | Kukimoto et al. |
| 2013/0092301 A1 | 4/2013 | Ebiko |
| 2013/0240101 A1 | 9/2013 | Kameda |
| 2014/0166169 A1* | 6/2014 | Tanaka ................ B60C 11/1376 152/209.15 |

FOREIGN PATENT DOCUMENTS

| | | |
|---|---|---|
| JP | S63-041204 | 2/1988 |
| JP | 2002-029216 | 1/2002 |
| JP | 2004-122904 | 4/2004 |
| JP | 2005-263180 | 9/2005 |
| JP | 2011-057053 | 3/2011 |
| JP | 2011-230699 | 11/2011 |
| JP | 2011230699 A * | 11/2011 |
| JP | 2011230699 A * | 11/2011 |
| JP | 2012-106608 | 6/2012 |
| JP | 2013-189121 | 9/2013 |
| WO | WO 2012/066714 | 5/2012 |

* cited by examiner

| Rib Configuration (applicable drawing) | | Conventional Example 1 | Comparative Example 1 | Working Example 1 | Working Example 2 | Working Example 3 | Working Example 4 |
|---|---|---|---|---|---|---|---|
| | | FIG. 1 | FIG. 1 | FIG. 1 | FIG. 1 | FIG. 1 | FIG. 1 |
| First side outer rib | Protruding | - | - | - | - | - | - |
| | Protruding amount [mm] | - | - | - | - | - | - |
| First side inner rib | Protruding | - | - | Protruding | - | Protruding | - |
| | Protruding amount [mm] | - | - | 1.0 | - | 2.0 | - |
| Tire equatorial plane rib | Protruding | - | Protruding | Protruding | Protruding | Protruding | Protruding |
| | Protruding amount [mm] | - | 0.04 | 0.04 | 0.04 | 0.04 | 2.0 |
| Second side inner rib | Protruding | - | - | - | Protruding | Protruding | Protruding |
| | Protruding amount [mm] | - | - | - | 1.0 | 1.0 | 1.0 |
| Second side outer rib | Protruding | - | - | - | - | - | Protruding |
| | Protruding amount [mm] | - | - | - | - | - | 0.04 |
| First side groove surface area ratio Ra | | - | - | 0.18 | 0.18 | 0.18 | 0.18 |
| Second side groove surface area ratio Rb | | - | - | 0.35 | 0.35 | 0.35 | 0.35 |
| Steering stability at high speeds | | 100 | 100 | 102 | 101 | 103 | 102 |
| Durability at high speeds when a camber is applied | | Baseline | Same as baseline | +0.25 | Same as baseline | +0.5 | +0.25 |
| Conicity | | 100 | 100 | 95 | 98 | 93 | 96 |

FIG. 6A

| | Working Example 5 | Working Example 6 | Working Example 7 | Working Example 8 | Working Example 9 | Working Example 10 |
|---|---|---|---|---|---|---|
| Rib Configuration (applicable drawing) | FIG. 1 | FIG. 1 | FIG. 1 | FIG. 1 | FIG. 1 | FIG. 1 |
| First side outer rib Protruding | Protruding | - | Protruding | Protruding | - | - |
| First side outer rib Protruding amount [mm] | 2.0 | - | 3.0 | 2.0 | - | - |
| First side inner rib Protruding | Protruding | Protruding | Protruding | Protruding | Protruding | Protruding |
| First side inner rib Protruding amount [mm] | 1.0 | 2.5 | 2.5 | 1.5 | 2.1 | 2.0 |
| Tire equatorial plane rib Protruding | Protruding | Protruding | Protruding | Protruding | Protruding | Protruding |
| Tire equatorial plane rib Protruding amount [mm] | 0.04 | 2.0 | 2.0 | 1.0 | 1.0 | 0.05 |
| Second side inner rib Protruding | - | Protruding | Protruding | Protruding | - | - |
| Second side inner rib Protruding amount [mm] | - | 1.0 | 1.0 | 0.5 | - | - |
| Second side outer rib Protruding | - | Protruding | Protruding | Protruding | - | - |
| Second side outer rib Protruding amount [mm] | - | 0.04 | 0.04 | 0.05 | - | - |
| First side groove surface area ratio Ra | 0.18 | 0.18 | 0.18 | 0.18 | 0.18 | 0.18 |
| Second side groove surface area ratio Rb | 0.35 | 0.35 | 0.35 | 0.35 | 0.35 | 0.35 |
| Steering stability at high speeds | 103 | 104 | 105 | 108 | 103 | 104 |
| Durability at high speeds when a camber is applied | +0.5 | +0.75 | +1.0 | +2.0 | +0.75 | +0.75 |
| Conicity | 92 | 90 | 88 | 86 | 93 | 91 |

FIG. 6B

| | Working Example 11 | Working Example 12 | Working Example 13 | Working Example 14 | Working Example 15 |
|---|---|---|---|---|---|
| Rib Configuration (applicable drawing) | FIG. 1 | FIG. 1 | FIG. 1 | FIG. 1 | FIG. 1 |
| First side outer rib — Protruding | - | - | - | - | - |
| First side outer rib — Protruding amount [mm] | - | - | - | - | - |
| First side inner rib — Protruding | Protruding | Protruding | Protruding | Protruding | Protruding |
| First side inner rib — Protruding amount [mm] | 0.6 | 1.25 | 1.25 | 1.25 | 1.25 |
| Tire equatorial plane rib — Protruding | Protruding | Protruding | Protruding | Protruding | Protruding |
| Tire equatorial plane rib — Protruding amount [mm] | 0.2 | 1.2 | 1.2 | 1.2 | 1.2 |
| Second side inner rib — Protruding | - | Protruding | Protruding | Protruding | Protruding |
| Second side inner rib — Protruding amount [mm] | - | 0.2 | 0.2 | 0.2 | 0.2 |
| Second side outer rib — Protruding | - | - | - | - | - |
| Second side outer rib — Protruding amount [mm] | - | - | - | - | - |
| First side groove surface area ratio Ra | 0.25 | 0.18 | 0.18 | 0.20 | 0.30 |
| Second side groove surface area ratio Rb | 0.35 | 0.35 | 0.30 | 0.25 | 0.40 |
| Steering stability at high speeds | 105 | 104 | 104 | 104 | 104 |
| Durability at high speeds when a camber is applied | +1.0 | +0.75 | +0.75 | +0.75 | +0.75 |
| Conicity | 88 | 91 | 88 | 94 | 86 |

FIG. 7A

| Rib Configuration (applicable drawing) | | Working Example 16 | Working Example 17 | Working Example 18 | Working Example 19 | Working Example 20 |
|---|---|---|---|---|---|---|
| | | FIG. 1 | FIG. 1 | FIG. 1 | FIG. 1 | FIG. 1 |
| First side outer rib | Protruding | | | | | |
| | Protruding amount [mm] | - | - | - | - | - |
| First side inner rib | Protruding | Protruding | Protruding | Protruding | Protruding | Protruding |
| | Protruding amount [mm] | 1.1 | 1.8 | 0.6 | 0.6 | 0.6 |
| Tire equatorial plane rib | Protruding | Protruding | Protruding | Protruding | Protruding | Protruding |
| | Protruding amount [mm] | 1.0 | 1.0 | 0.4 | 0.4 | 0.4 |
| Second side inner rib | Protruding | Protruding | Protruding | Protruding | Protruding | Protruding |
| | Protruding amount [mm] | 0.9 | 0.2 | 0.2 | 0.2 | 0.2 |
| Second side outer rib | Protruding | | | | | |
| | Protruding amount [mm] | - | - | - | - | - |
| First side groove surface area ratio Ra | | 0.25 | 0.25 | 0.27 | 0.24 | 0.25 |
| Second side groove surface area ratio Rb | | 0.35 | 0.35 | 0.34 | 0.37 | 0.35 |
| Steering stability at high speeds | | 106 | 107 | 105 | 105 | 105 |
| Durability at high speeds when a camber is applied | | +2.0 | +1.5 | +1.5 | +1.5 | +1.5 |
| Conicity | | 86 | 90 | 88 | 84 | 86 |

FIG. 7B

| | Conventional Example 2 | Comparative Example 2 | Working Example 21 | Working Example 22 | Working Example 23 | Working Example 24 | Working Example 25 |
|---|---|---|---|---|---|---|---|
| Rib Configuration (applicable drawing) | FIG. 2 | FIG. 2 | FIG. 2 | FIG. 2 | FIG. 2 | FIG. 2 | FIG. 2 |
| First side outer rib Protruding | - | - | - | Protruding | - | Protruding | Protruding |
| First side outer rib Protruding amount [mm] | - | - | - | 2.0 | - | 2.5 | 2.0 |
| First side inner rib Protruding | - | Protruding | Protruding | Protruding | - | Protruding | Protruding |
| First side inner rib Protruding amount [mm] | - | 0.04 | 1.0 | 1.0 | 2.0 | 2.0 | 1.5 |
| Second side inner rib Protruding | - | - | Protruding | Protruding | Protruding | Protruding | Protruding |
| Second side inner rib Protruding amount [mm] | - | - | - | 0.04 | - | 1.0 | 1.0 |
| Second side outer rib Protruding | - | - | - | - | Protruding | Protruding | Protruding |
| Second side outer rib Protruding amount [mm] | - | - | - | - | 1.0 | 1.0 | 1.0 |
| First side groove surface area ratio Ra | - | - | - | 0.04 | 0.04 | 0.04 | 0.05 |
| Second side groove surface area ratio Rb | - | - | 0.18 | 0.18 | 0.18 | 0.18 | 0.18 |
| Steering stability at high speeds | - | - | 0.35 | 0.35 | 0.35 | 0.35 | 0.35 |
| | 100 | 100 | 102 | 104 | 103 | 105 | 105 |
| Durability at high speeds when a camber is applied | Baseline | Same as baseline | +0.25 | +0.75 | +0.5 | +1.0 | +2.0 |
| Conicity | 100 | 100 | 95 | 92 | 95 | 86 | 86 |

FIG. 8A

| | Working Example 26 | Working Example 27 | Working Example 28 | Working Example 29 | Working Example 30 | Working Example 31 | Working Example 32 | Working Example 33 |
|---|---|---|---|---|---|---|---|---|
| Rib Configuration (applicable drawing) | FIG. 2 | FIG. 2 | FIG. 2 | FIG. 2 | FIG. 2 | FIG. 2 | FIG. 2 | FIG. 2 |
| First side outer rib | Protruding | - | - | - | - | - | - | - |
| First side outer rib Protruding amount [mm] | - | - | - | - | - | - | - | - |
| First side inner rib | Protruding | Protruding | Protruding | Protruding | Protruding | Protruding | Protruding | Protruding |
| First side inner rib Protruding amount [mm] | 2.1 | 2.0 | 1.1 | 1.0 | 0.6 | 0.5 | 0.6 | 0.6 |
| Second side inner rib | Protruding | Protruding | Protruding | Protruding | Protruding | Protruding | Protruding | Protruding |
| Second side inner rib Protruding amount [mm] | 1.0 | 0.05 | 1.0 | 1.0 | 0.2 | 0.2 | 0.2 | 0.2 |
| Second side outer rib | Protruding | - | - | - | - | - | - | - |
| Second side outer rib Protruding amount [mm] | - | - | - | - | - | - | - | - |
| First side groove surface area ratio Ra | 0.18 | 0.18 | 0.18 | 0.25 | 0.18 | 0.27 | 0.24 | 0.25 |
| Second side groove surface area ratio Rb | 0.35 | 0.35 | 0.35 | 0.35 | 0.35 | 0.34 | 0.37 | 0.35 |
| Steering stability at high speeds | 103 | 104 | 106 | 107 | 105 | 105 | 105 | 105 |
| Durability at high speeds when a camber is applied | +0.75 | +0.75 | +2.0 | +2.0 | +1.5 | +1.5 | +1.5 | +1.5 |
| Conicity | 93 | 91 | 86 | 90 | 90 | 88 | 84 | 86 |

FIG. 8B

PNEUMATIC TIRE

TECHNICAL FIELD

The present technology relates to a pneumatic tire and particularly relates to a pneumatic tire having enhanced steering stability at high speeds and durability at high speeds when a camber is applied.

BACKGROUND ART

Conventionally, pneumatic tires with an object of securing straight-line stability are known. For example, the pneumatic tire of Japanese Unexamined Patent Application Publication No. 2002-29216A comprises land portions defined by grooves that intersect a tread width direction cross section in the tread portion. When viewed in a tread width direction cross section, the ground contact surface of the land portions is curved so as to protrude to the outer side in the radial direction, and the apex of the ground contact surface closest to the profile line of the tread surface across the entire tread width is offset from the lateral center of the land portion toward one side edge of the land portion by from 0.1 to 0.4 times the width of the land portion.

Also, Japanese Unexamined Patent Application Publication No. 2004-122904A, for example, describes a pneumatic tire comprising a center land portion extending along the tire equator, an outer land portion extending in the shoulder portion, an intermediate land portion located between the center land portion and the outer land portion; the land portions on a tread surface being defined by circumferential grooves. In such a pneumatic tire when in a regular state of being assembled on a regular rim, inflated to a regular internal pressure, and having no load applied, when viewed in the tire meridian cross section including the tire axis, the radius of curvature R1 of the outer surface of the center land portion is greater than the radius of curvature R2 of the outer surface of the intermediate land portion, and the center of each radius of curvature R1, R2 lies is at the same position.

In addition, Japanese Unexamined Patent Application Publication No. 2011-230699A, for example, describes a pneumatic tire comprising at least one carcass and belt layer, a belt cover layer formed by spirally winding a reinforcing cord made of an organic fiber cord in the tire circumferential direction on the outer side of the belt layer in the tire radial direction, and a tread portion comprising a tread surface different in the groove surface area ratio on either side of the tire equatorial plane. The tread surface of such a pneumatic tire has a tread profile in which, when viewed in the tire median cross section, the outermost position in the tire radial direction is located on the side of the tire equatorial plane with the smaller groove surface area ratio, and shoulder drop amounts in the tire radial direction from the outermost position in the tire radial direction at both ends in the tire width direction are equal.

The pneumatic tire described in Japanese Unexamined Patent Application Publication No. 2011-230699A is provided with a tread portion that comprises a tread surface in which the groove surface area ratio is different on either side of the tire equatorial plane. Water drainage performance is obtained from the side with the greater groove surface area ratio (that is, the side with more grooves), and steering stability on dry road surfaces is obtained from the side with the smaller groove surface area ratio (that is, the side with less grooves and thus greater rigidity). As a result, both water drainage performance and steering stability can be obtained. Moreover, the tread surface of the pneumatic tire has a tread profile in which, when viewed in the tire median cross section, the outermost position in the tire radial direction is located on the side of the tire equatorial plane with the smaller groove surface area ratio (that is, the side of the tread portion having greater rigidity). The ground contact pressure at the side with the greater rigidity is increased, uniforming the ground contact pressure across the entire ground contact region. As a result, increases in conicity due to a difference in rigidity of the tread portion on either side of the tire equatorial plane are suppressed without any negative impact on durability at high speeds.

In recent years, in line with improvements in vehicle performance, pneumatic tires that can achieve both steering stability at high speeds and durability at high speeds when a camber is applied have been demanded. To cater to such a demand to ensure steering stability, a pneumatic tire such as that described in Japanese Unexamined Patent Application Publication No. 2002-29216A has been effective. The pneumatic tire of Japanese Unexamined Patent Application Publication No. 2002-29216A has a configuration in which a rib (land portion), formed in the tread portion, has a profile that, when viewed in the tire meridian cross section, protrudes to the outer side in the tire radial direction beyond the profile of the tread surface so that the rib has better contact with the ground. However, when a camber is applied to a vehicle, durability at high speeds tends to decrease. This is because, in the case of a negative camber, ribs located on the inner side of the tire equator plane when the tire is mounted to a vehicle have a longer footprint length than ribs located on the outer side of the tire equatorial plane. Consequently, achieving both steering stability at high speeds and durability at high speeds when a camber is applied has been difficult.

The pneumatic tire described in Japanese Unexamined Patent Application Publication No. 2004-122904A is designed for enhanced durability. However, the pneumatic tire is for light trucks. Also, the pneumatic tire has a configuration in which, due to differences in the radius of curvature, a center land portion protrudes to the outer side in the tire radial direction a great deal more than the intermediate land portion. Consequently, in the case of the pneumatic tire being applied to a vehicle with a camber, durability of a center land portion decreases and steering stability also decreases.

In addition, the pneumatic tire described in Japanese Unexamined Patent Application Publication No. 2011-230699A comprises a tread profile in which the outermost position in the tire radial direction is located on the side of the tire equatorial plane with the smaller groove surface area ratio, namely the side of the tread portion with the greater rigidity. However, the pneumatic tire described in Japanese Unexamined Patent Application Publication No. 2011-230699A specifies the profile of an entire tread surface including the grooves, yet in essence, the portion that comes into contact with the ground is the land portions (ribs) and not the grooves. In other words, the pneumatic tire described in Japanese Unexamined Patent Application Publication No. 2011-230699A lacks specifics regarding the land portions and the grooves. As a result, it is difficult to suppress increases in conicity to a high degree leaving room for enhancement.

SUMMARY

The present technology provides a pneumatic tire capable of achieving both steering stability at high speeds and durability at high speeds when a camber is applied, and suppressing increases in conicity.

A pneumatic tire of the present technology includes: at least three circumferential grooves extending in a tire circumferential direction in a tread portion; and at least four ribs defined by the at least three circumferential grooves, the at least four ribs extending in the tire circumferential direction; wherein at least two of the ribs including the rib disposed on a first side of a tire equatorial plane in a tire width direction and the rib disposed on a second side protrude to an outer side in a tire radial direction beyond a profile line of a tread surface when viewed in a meridian cross section; the protruding amount decreases in order from the first side in the tire width direction to the second side; and a groove surface area ratio of the tread surface is greater on the second side of the tire equatorial plane in the tire width direction than on the first side.

According to the pneumatic tire, the at least two ribs protrude beyond the profile line with the protruding amount decreasing in order from the first side to the second side. Consequently, when a negative camber is applied, by mounting the tire to a vehicle with the first side corresponding to the vehicle outer side and the second side corresponding to the vehicle inner side, or alternatively when a positive camber is applied, by mounting the tire to a vehicle with the first side corresponding to the vehicle inner side and the second side corresponding to the vehicle outer side, better contact with the ground in the tire width direction is achieved. As a result, increases in steering stability at high speeds are possible. Moreover, when a negative camber is applied, by mounting the tire to a vehicle with the first side corresponding to the vehicle outer side and the second side corresponding to the vehicle inner side, or alternatively when a positive camber is applied, by mounting the tire to a vehicle with the first side corresponding to the vehicle inner side and the second side corresponding to the vehicle outer side, excessive contact with the ground in the tire width direction is alleviated. As a result, the footprint lengths of the respective ribs (the length in the tire circumferential direction of the region of the tread surface that comes into contact with the road surface) are uniformed, which makes it possible to increase durability at high speeds when a camber is applied. Consequently, both steering stability at high speeds and durability at high speeds when a camber is applied can be achieved.

Moreover, according to the pneumatic tire, the groove surface area ratio on the second side of the tire equatorial plane in the tire width direction on which the protruding amount of the rib is smaller is greater than the groove surface area ratio on the first side in the tire width direction on which the protruding amount of the rib is larger. As a result, a difference in rigidity of the tread portion across the tire width direction is established, whereby the nonuniformity (difference in rigidity) of the form of the tread portion in the tire width direction due to the difference between the protruding amounts of the ribs is negated on account of the groove surface area ratio. As the difference in rigidity can be suppressed, increases in conicity can be suppressed. In particular, according to the pneumatic tire, because the nonuniformity (difference in rigidity) of the form due to the ribs that come into contact with the road surface is negated, increases in conicity can be suppressed to a higher degree than configurations in which the entire tread surface profile including the grooves is specified.

In addition, the pneumatic tire of the present technology may have a configuration in which the protruding amount beyond the profile line of the ribs is from 0.05 mm to 2.0 mm, both inclusive.

When the protruding amount of the ribs is less than 0.05 mm, the effects of better contact with the ground and uniformity of the footprint lengths are difficult to achieve due to the smaller protruding amount of the ribs. When the protruding amount of the ribs exceeds 2.0 mm, the effects of better contact with the ground and uniformity of the footprint lengths are difficult to achieve due to the larger protruding amount of the ribs. Consequently, when the protruding amount of the ribs is from 0.05 mm to 2.0 mm, both inclusive, both steering stability at high speeds and durability at high speeds when a camber is applied can be significantly achieved.

In addition, the pneumatic tire of the present technology may have a configuration in which the groove surface area ratio Ra on the side on which the rib has the larger protruding amount is from 0.20 to 0.30, both inclusive; the groove surface area ratio Rb on the side on which the rib has the smaller protruding amount is from 0.25 to 0.40, both inclusive; and the groove surface area ratios Ra, Rb satisfy the relationship Ra<Rb.

From the perspective of satisfying the relationship Ra<Rb of the groove surface area ratios Ra, Rb and suppressing the difference in rigidity between the ribs, on the side on which the rib has the larger protruding amount, the groove surface area ratio Ra is from 0.20 to 0.30, both inclusive, and on the side on which the rib has the smaller protruding amount, the groove surface area ratio Rb is from 0.25 to 0.40, both inclusive. As a result, the effect of suppressing increases in conicity can be significantly achieved.

In addition, the pneumatic tire of the present technology may have a configuration in which a vehicle inner/outer side orientation when mounted to a vehicle is designated, the protruding amount of the ribs decreases in order from the vehicle outer side to the vehicle inner side, and the groove surface area ratio of the tread surface is greater on the vehicle inner side than the vehicle outer side.

According to the pneumatic tire, in the case of being adapted to high-speed traveling, a negative camber is preferably applied from the perspective of enhancing steering stability. When a negative camber is applied, a configuration in which the ribs have a protruding amount that decreases in order from the vehicle outer side to the vehicle inner side can significantly achieve the effects of better contact with the ground and uniformity of the footprint lengths. Consequently, both the effects of steering stability at high speeds and durability at high speeds when a negative camber is applied can be significantly achieved. Moreover, when a negative camber is applied, a configuration in which the groove surface area ratio of the tread surface is greater on the vehicle inner side than the vehicle outer side can suppress the difference in rigidity between the ribs and suppress increases in conicity to a high degree.

In addition, the pneumatic tire of the present technology may have a configuration in which the ribs protruding beyond the profile line are provided adjacent to one another interposed by the circumferential groove, and a difference between the protruding amounts of the adjacent ribs is from 0.1 mm to 0.8 mm, both inclusive.

When the difference between the protruding amounts of the adjacent ribs is less than 0.1 mm, the effects of better contact with the ground and uniformity of the footprint lengths are difficult to achieve due to the difference between the protruding amounts of the ribs being too small. When the difference between the protruding amounts of the adjacent ribs exceeds 0.8 mm, the effects of better contact with the ground and uniformity of the footprint lengths are difficult to achieve due to the difference between the protruding amounts of the ribs being too great. Consequently, when the difference between the protruding amounts of the adjacent ribs is from 0.01 mm to 0.8 mm, both inclusive, the effects of both steering stability at high speeds and durability at high speeds when a camber is applied can be significantly achieved. Moreover, when a camber is applied, a configuration in which the groove surface area ratio of the tread surface is greater on the vehicle inner side than the vehicle outer side can suppress the difference in rigidity between the ribs and suppress increases in conicity to a high degree.

Also, the pneumatic tire of the present technology may have a configuration in which the ribs protruding beyond the profile line are each provided between the circumferential grooves.

The ribs protruding beyond the profile line, which are each provided between circumferential grooves, are ribs provided on the inner side in the tire width direction, excluding outermost ribs in the tire width direction. These ribs provided on the inner side in the tire width direction protrude to the outer side in the tire radial direction beyond the profile line, and the protruding amount decreases in order from the first side in the tire width direction to the second side. This configuration contributes greatly to achieving the effects of better contact with the ground and uniformity of the footprint lengths. Consequently, the effects of both steering stability at high speeds and durability at high speeds when a camber is applied can be significantly achieved. Moreover, when a camber is applied, a configuration in which the groove surface area ratio of the tread surface is greater on the vehicle inner side than the vehicle outer side can suppress the difference in rigidity between the ribs and suppress increases in conicity to a high degree.

The pneumatic tire according to the present technology can achieve both steering stability at high speeds and durability at high speeds when a camber is applied, and can suppress increases in conicity.

BRIEF DESCRIPTION OF DRAWINGS

FIGS. 6A-6B include a table showing results of performance testing of pneumatic tires according to working examples of the present technology.

FIGS. 7A-7B include a table showing results of performance testing of pneumatic tires according to working examples of the present technology.

FIGS. 8A-8B include a table showing results of performance testing of pneumatic tires according to working examples of the present technology.

DETAILED DESCRIPTION

An embodiment of the present technology is described in detail below with reference to the drawings. However, the present technology is not limited by the embodiment. Furthermore, components of the embodiment include elements that may be easily replaced by those skilled in the art or that are substantially identical to components of the embodiment. Furthermore, a plurality of modified examples described in the embodiment may be combined as desired within the scope of obviousness by those skilled in the art.

Figure 1:
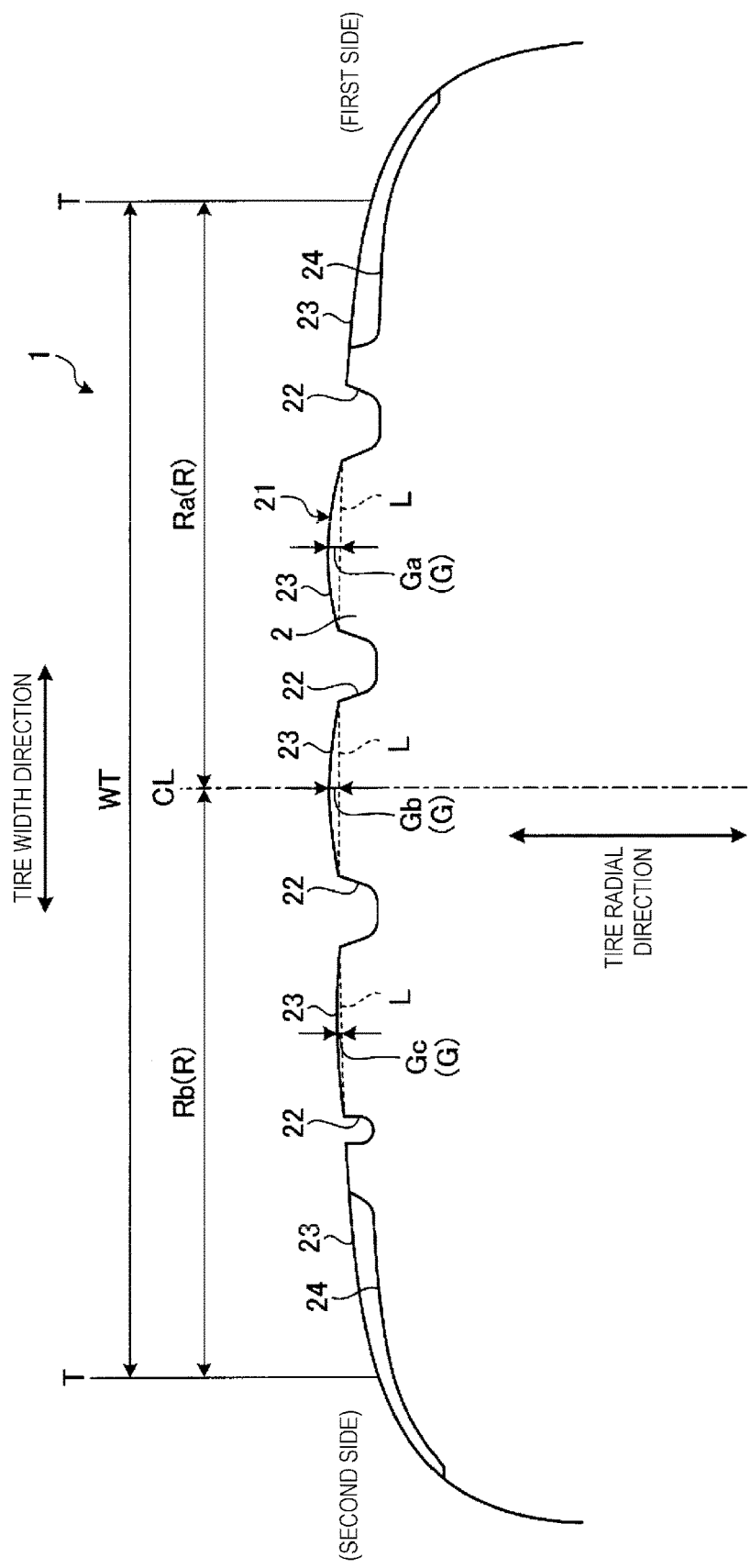
FIG. 1 is a meridian cross-sectional view of a tread portion of a pneumatic tire according to an embodiment of the present technology.
Figure 2:
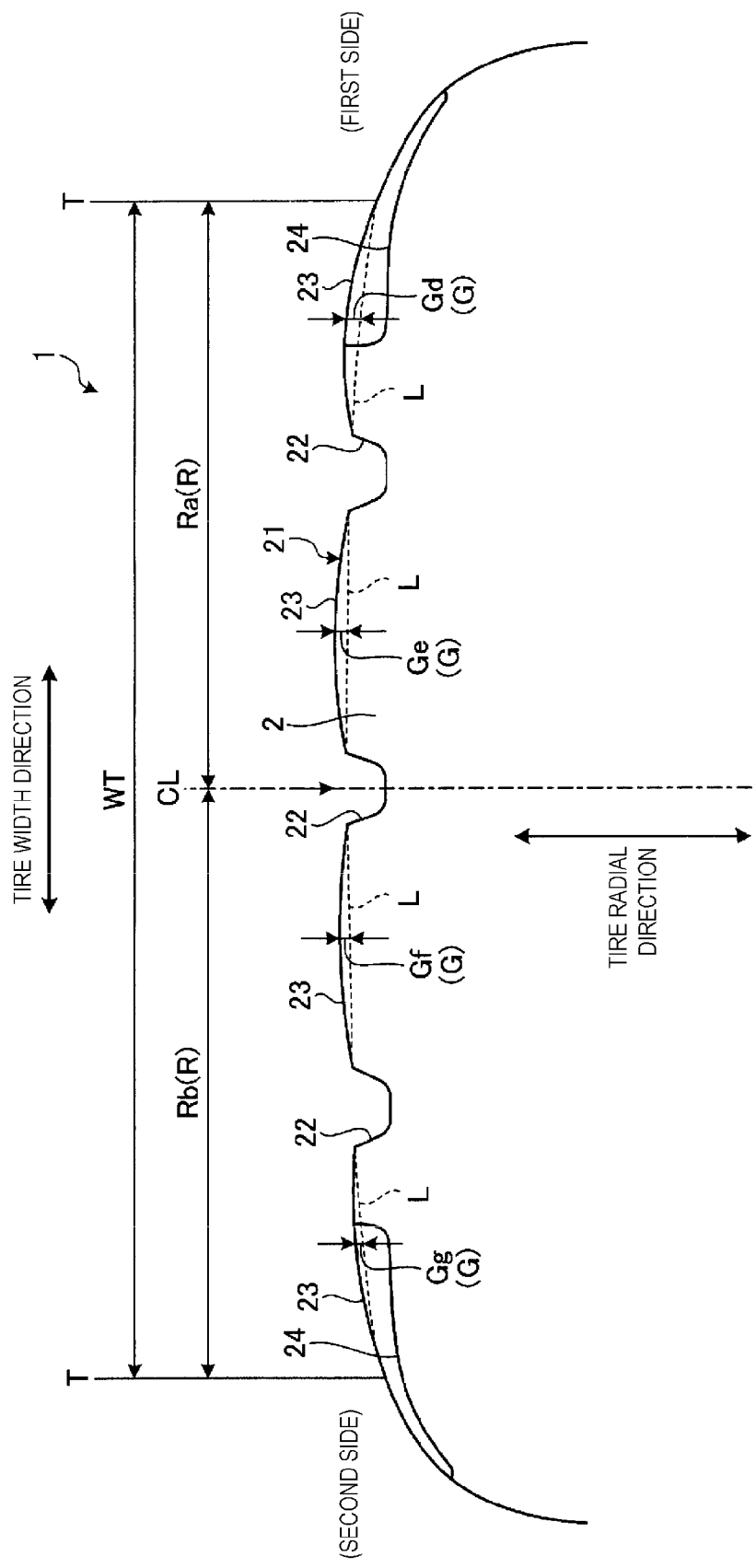
FIG. 2 is a meridian cross-sectional view of the tread portion of the pneumatic tire according to the embodiment of the present technology.
Figure 3:
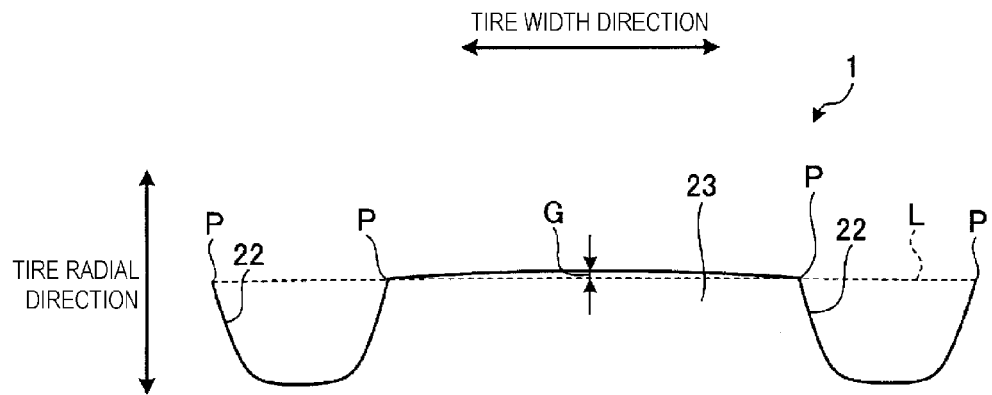
FIG. 3 is an enlarged meridian cross-sectional view of the tread portion of the pneumatic tire according to the embodiment of the present technology.
Figure 4:
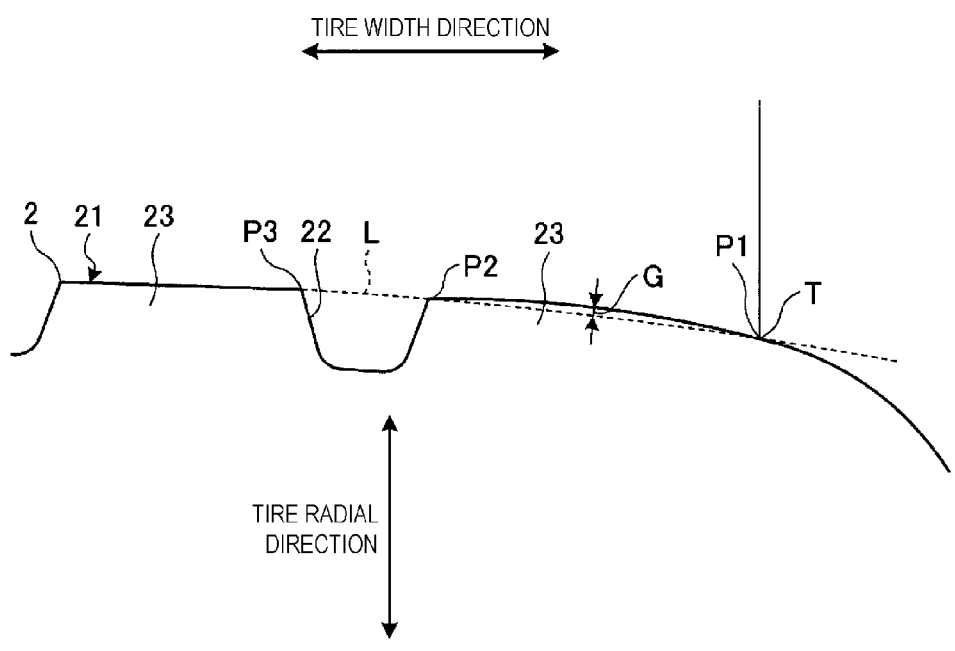
FIG. 4 is an enlarged meridian cross-sectional view of the tread portion of the pneumatic tire according to the embodiment of the present technology.
Figure 5:
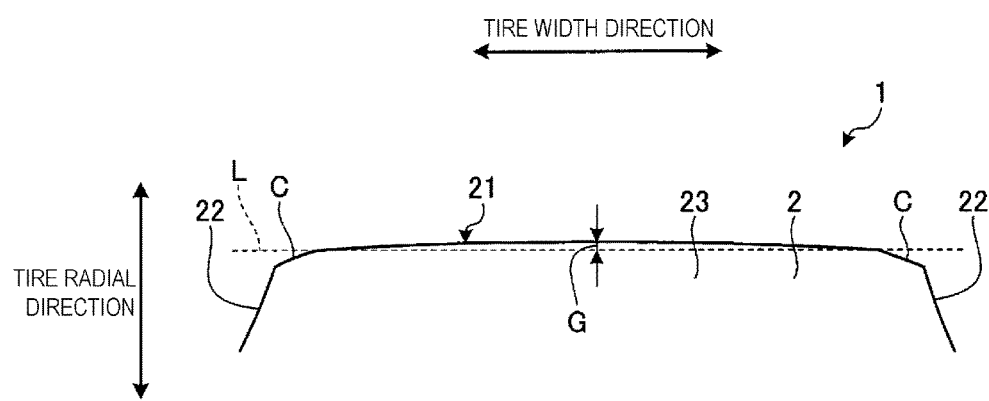
FIG. 5 is an enlarged meridian cross-sectional view of the tread portion of the pneumatic tire according to the embodiment of the present technology.

FIG. 1 and FIG. 2 are meridian cross-sectional views of tread portions of pneumatic tires according to the present embodiment, and FIGS. 3 to 5 are enlarged meridian cross-sectional views of the tread portion of the pneumatic tire according to the present embodiment.

In the following description, "tire radial direction" refers to a direction orthogonal to the rotational axis (not depicted) of the pneumatic tire 1. "Inner side in the tire radial direction" refers to a side facing the rotational axis in the tire radial direction, and "outer side in the tire radial direction" refers to the side distanced from the rotational axis in the tire radial direction. "Tire circumferential direction" refers to a circumferential direction taking the rotational axis as a center axis. In addition, "tire width direction" refers to a direction parallel to the rotational axis. "Inner side in the tire width direction" refers to a side facing a tire equatorial plane CL (tire equatorial line) in the tire width direction, and "outer side in the tire width direction" refers to a side distanced from the tire equatorial plane CL in the tire width direction. "Tire equatorial plane CL" refers to a plane that is orthogonal to the rotational axis of the pneumatic tire 1 and that passes through the center in the tire width direction of the pneumatic tire 1. "Tire width" is a width in the tire width direction between components located to the outer side in the tire width direction, or in other words, the distance between the components that are most distant in the tire width direction from the tire equatorial plane CL. "Tire equatorial line" refers to a line along the tire circumferential direction of the pneumatic tire 1 that lies on the tire equatorial plane CL. In the present embodiment, the tire equatorial line uses the same reference sign CL as the tire equatorial plane.

In the pneumatic tire 1 of the present embodiment, a tread portion 2 is formed from a rubber material (tread rubber) and exposed on the outermost side of the pneumatic tire 1 in the tire radial direction, as illustrated in FIG. 1 and FIG. 2. The surface of the tread portion 2 corresponds to a profile of the pneumatic tire 1. A tread surface 21 is formed on an outer peripheral surface of the tread portion 2, in other words, on a road contact surface that comes in contact with a road surface during driving. The tread portion 2 is provided with a circumferential groove 22 that opens to the tread surface 21. The circumferential groove 22 has a groove depth from the tread surface 21 to the groove bottom of 5 mm or greater. A plurality of the circumferential grooves 22 (in FIG. 1, four, in FIG. 2, three) are provided in the tire width direction extending next to one another in the tire circumferential direction. Also, in the tread portion 2, a plurality of ribs 23 (in FIG. 1 five, in FIG. 2, four) are defined in the tire width direction by the plurality of circumferential grooves 22 and extend next to one another in the tire circumferential direction. In the ribs 23 of the tread portion 2, a plurality of lug grooves 24 are provided in the tire circumferential direction extending next to one another in a direction that intersects with the circumferential grooves 22. In FIG. 1 and FIG. 2, the lug grooves 24 are only provided in the outermost ribs 23 in the tire width direction. However, lug grooves 24 may also be provided in the other ribs 23. The lug grooves 24 may have a form that communicates with the circumferential grooves 22 or may have a form that does not communicate with the circumferential grooves 22. In addition, when the lug grooves 24 are formed in the outermost ribs 23 in the tire width direction, the lug grooves 24 are formed so as to open to the outer side in the tire width direction. Note that, as illustrated in FIG. 1, when the rib 23 is formed at the tire equatorial plane CL, even if a groove that extends in the tire circumferential direction with a groove depth of 5 mm or greater is formed in the rib 23 formed at the tire equatorial plane CL, the groove is not included as a circumferential groove 22.

Although not illustrated, the pneumatic tire 1 also comprises shoulder portions disposed connected to both outer side portions in the tire width direction of the tread portion 2; sidewall portions connected to the shoulder portions, the sidewall portions being exposed at the outermost positions in the tire width direction of the pneumatic tire 1; and bead portions for engaging with the rim connected to the sidewall portions. Also, although not illustrated, bead cores are provided inside the bead portions of the pneumatic tire 1. The bead cores are formed by winding bead wire (steel wire) in the tire circumferential direction to form a ring. In addition, the pneumatic tire 1 comprises a carcass layer. The carcass layer is folded over the pair of bead cores from the inner side in the tire width direction to the outer side in the tire width direction and wrapped in a toroidal shape in the tire circumferential direction to form the framework of the tire. Furthermore, the pneumatic tire 1 comprises a multi-layer structured belt layer in which at least two belt layers are layered. The belt layer is disposed on the outer side in the radial direction, namely on the periphery of the carcass layer, within the tread portion 2.

When such a pneumatic tire 1 is new, at least two of the ribs 23 including a rib 23 disposed on a first side of the tire equatorial plane in the tire width direction and a rib 23 disposed on a second side are formed protruding to the outer side in the tire radial direction beyond a profile line L of the tread surface 21 when viewed in the tire meridian cross section. Also, the protruding amount G of the protruding ribs 23 decreases in order from the first side in the tire width direction to the second side in the tire width direction. In FIG. 1, an example is illustrated in which the outermost ribs 23 in the tire width direction are formed to not protrude, the three ribs each provided between the circumferential grooves 22 are formed to protrude beyond the profile line L, and the relationship between the protruding amounts G from the first side to the second side is such that Ga>Gb>Gc. Also, in FIG. 2, all (four) of the ribs 23 are formed to protrude beyond the profile line L, and the relationship between the protruding amounts G from the first side to the second side is such that Gd>Ge>Gf>Gg.

Note that in the case that the at least two ribs 23 that protrude beyond the profile line L include the rib 23 disposed on the first side of the tire equatorial plane and the rib 23 disposed on the second side, the at least two ribs 23 may not be adjacent to each other interposed by the circumferential groove 22. Also, a rib 23 that does not protrude beyond the profile line L may be disposed in the tire width direction between the ribs 23 that protrude beyond the profile line L.

Here, "profile line L" refers to, in the case as illustrated in FIG. 3 of the rib 23 disposed between the circumferential grooves 22, a circular arc drawn at a maximum radius of curvature having a center on the inner side of the tread surface 21 in the tire radial direction and passing through at least three opening edges P of four opening edges P of two adjacent circumferential grooves 22 located on either side of the rib 23 in the tire width direction when viewed in the meridian cross section.

Also, "profile line L" refers to, in the case as illustrated in FIG. 4 of the outermost rib 23 in the tire width direction, a circular arc drawn at a radius of curvature having a center on the inner side of the tread surface 21 in the tire radial direction and passing through P1, P2, and P3; wherein P1 is a ground contact edge T of the outermost rib 23, P2 is an opening edge on the outer side in the tire width direction of the circumferential groove 22 adjacent to the outermost rib 23, and P3 is an opening edge on the inner side in the tire width direction of the circumferential groove 22, when viewed in the meridian cross section.

Note that, as illustrated in FIG. 5, when a chamfer C is provided on the opening edge of the circumferential groove 22, the profile line L is defined as described above by taking the most outwardly positioned edge point in the tire radial direction as the opening edge. In FIG. 5, the illustrated rib 23 is disposed between the circumferential grooves 22, however the above holds for the outermost rib 23 in the tire width direction.

Additionally, the "ground contact edge T" refers to both outermost edges in the tire width direction of a region in which the tread surface 21 of the tread portion 2 of the pneumatic tire 1 comes into contact with the road surface when the pneumatic tire 1 is assembled on a regular rim and inflated at regular inner pressure, and a regular load is applied. The ground contact edge T continues in the tire circumferential direction. Also, the ground contact width WT is the spacing in the tire width direction between the two ground contact edges T.

Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). The "regular inner pressure" refers to "maximum air pressure" defined by JATMA, a maximum value in "tire load limits at various cold inflation pressures" defined by TRA, or "inflation pressures" defined by ETRTO. Note that "regular load" refers to "maximum load capacity" defined by JATMA, a maximum value in "tire load limits at various cold inflation pressures" defined by TRA, and "load capacity" defined by ETRTO.

In the pneumatic tire 1 described above, the groove surface area ratio R of the tread surface 21 on the second side of the tire equatorial plane in the tire width direction (Rb) is greater than the groove surface area ratio R of the tread surface 21 on the first side (Ra). The groove surface area ratio R is the ratio of the groove surface area of all the grooves 22, 24 to the surface area of the tread surface 21 (including both the ground contact surface area and the groove surface area) in the ground contact width WT described above. "Groove surface area" refers to the opening surface area of the grooves 22, 24 in the tread surface 21.

In such a manner, the pneumatic tire 1 of the present embodiment comprises the at least three circumferential grooves 22 extending in the tire circumferential direction in the tread portion 2, and the at least four ribs 23 defined by the circumferential grooves 22 and extending in the tire circumferential direction. In the pneumatic tire 1, the at least two ribs 23—the rib 23 disposed on the first side of the tire equatorial plane CL in the tire width direction and the rib 23 disposed on the second side—protrude to the outer side in the tire radial direction beyond the profile line L of the tread surface 21 when viewed in the meridian cross section. The protruding amount G of the protruding ribs 23 decreases in order from the first side in the tire width direction to the second side, and the groove surface area ratio R of the tread surface 21 on the second side of the tire equatorial plane CL in the tire width direction (Rb) is greater than the groove surface area ratio R of the tread surface 21 on the first side (Ra).

According to the pneumatic tire 1, the at least two ribs 23 protrude beyond the profile line L with the protruding amount G decreasing in order from the first side to the second side. Consequently, when a negative camber is applied, by mounting the tire to a vehicle with the first side corresponding to the vehicle outer side and the second side corresponding to the vehicle inner side, or alternatively when a positive camber is applied, by mounting the tire to a vehicle with the first side corresponding to the vehicle inner side and the second side corresponding to the vehicle outer side, better contact with the ground in the tire width direction is achieved. As a result, increases in steering stability at high speeds are possible. Moreover, when a negative camber is applied, by mounting the tire to a vehicle with the first side corresponding to the vehicle outer side and the second side corresponding to the vehicle inner side, or alternatively when a positive camber is applied, by mounting the tire on a vehicle with the first side corresponding to the vehicle inner side and the second side corresponding to the vehicle outer side, excessive contact with the ground in the tire width direction is alleviated. As a result, the footprint lengths of the respective ribs 23 (the length in the tire circumferential direction of the region of the tread surface 21 that comes into contact with the road surface) are uniformed, which makes it possible to increase durability at high speeds with a camber applied. Consequently, both steering stability at high speeds and durability at high speeds with a camber applied can be achieved.

Moreover, according to the pneumatic tire 1, the groove surface area ratio Rb on the second side of the tire equatorial plane in the tire width direction on which the protruding amount G of the ribs 23 is smaller is greater than the groove surface area ratio Ra on the first side in the tire width direction on which the protruding amount G of the ribs 23 is larger. As a result, a difference in rigidity of the tread portion 2 across the tire width direction is established, whereby the nonuniformity (difference in rigidity) of the form of the tread portion 2 in the tire width direction due to the difference between the protruding amounts G of the ribs 23 is negated on account of the groove surface area ratio R. As the difference in rigidity can be suppressed, increases in conicity can be suppressed. In particular, according to the pneumatic tire 1, because the nonuniformity (difference in rigidity) of the form due to the ribs 23 that come into contact with the road surface is negated, increases in conicity can be suppressed to a higher degree than configurations in which the entire tread surface 21 profile including the grooves 22, 24 is specified.

In the pneumatic tire 1 of the present embodiment, the ribs 23 preferably have a protruding amount G of from 0.05 mm to 2.0 mm, both inclusive, from the profile line L.

When the protruding amount G of the ribs 23 is less than 0.05 mm, the effects of better contact with the ground and uniformity of the footprint lengths are difficult to achieve due to the smaller protruding amount G of the ribs 23. When the protruding amount G of the ribs 23 exceeds 2.0 mm, the effects of better contact with the ground and uniformity of the footprint lengths are difficult to achieve due to the larger protruding amount G of the ribs 23. Consequently, when the protruding amount G of the ribs 23 is from 0.05 mm to 2.0 mm, both inclusive, both steering stability at high speeds and durability at high speeds with a camber applied can be significantly achieved. Note that to achieve a more significant effect of both steering stability at high speeds and durability at high speeds with a camber applied, the protruding amount G from the profile line L of the ribs 23 is preferably from 0.2 mm to 0.6 mm, both inclusive.

In addition, in the pneumatic tire 1 of the present embodiment, the groove surface area ratio Ra on the side on which the ribs 23 have the larger protruding amount G is from 0.20 to 0.30, both inclusive, and the groove surface area ratio Rb on the side on which the ribs 23 have the smaller protruding amount G is from 0.25 to 0.40, both inclusive. The groove surface area ratios Ra, Rb preferably satisfy the relationship Ra<Rb.

From the perspective of satisfying the relationship Ra<Rb of the groove surface area ratios Ra, Rb and suppressing the difference in rigidity between the ribs 23, on the side on which the ribs 23 have the larger protruding amount G, the groove surface area ratio Ra is from 0.20 to 0.30, both inclusive, and on the side on which the ribs 23 have the smaller protruding amount G, the groove surface area ratio Rb is from 0.25 to 0.40, both inclusive. As a result, the effect of suppressing increases in conicity can be significantly achieved. Note that from the perspective of suppressing increases in conicity, the groove surface area ratios Ra, Rb more preferably have a relationship such that Rb−Ra=from 0.07 to 0.13.

In addition, the pneumatic tire 1 of the present embodiment is preferably such that a vehicle inner/outer side orientation when mounted to a vehicle is designated, the ribs 23 have a protruding amount G that decreases in order from the vehicle outer side to the vehicle inner side, and the groove surface area ratio R of the tread surface 21 is greater on the vehicle inner side than the vehicle outer side.

The vehicle inner/outer side orientation of such a pneumatic tire 1 may be designated by indicators provided on the sidewall portions, which indicate the vehicle inner/outer side orientation when the pneumatic tire 1 is mounted to a vehicle, for example. Note that the designations of the vehicle inner side and the vehicle outer side are not limited to cases when the tire 1 is mounted to the vehicle. For example, in cases when the tire 1 is assembled on a rim, orientation of the rim with respect to the inner side and the outer side of the vehicle in the tire width direction is predetermined. Therefore, in cases when the pneumatic tire 1 is assembled on a rim, the orientation with respect to the vehicle inner side and the vehicle outer side in the tire width direction is designated.

According to the pneumatic tire 1, in the case of high-speed traveling, a negative camber is preferably applied from the perspective of enhancing steering stability. When a negative camber is applied, a configuration in which the ribs 23 have a protruding amount G that decreases in order from the vehicle outer side to the vehicle inner side can significantly achieve the effects of better contact with the ground and uniformity of the footprint lengths. Consequently, both the effects of steering stability at high speeds and durability at high speeds when a negative camber is applied can be significantly achieved. Moreover, when a negative camber is applied, a configuration in which the groove surface area ratio R of the tread surface 21 is greater on the vehicle inner side than the vehicle outer side can suppress the difference in rigidity between the ribs 23 and suppress increases in conicity to a high degree.

Also, in the pneumatic tire 1 of the present embodiment, the ribs 23 protruding beyond the profile line L are preferably provided adjacent to one another interposed by a circumferential groove 22, and the difference between the respective protruding amounts G of the adjacent ribs 23 is preferably from 0.1 mm to 0.8 mm, both inclusive.

When the difference between the protruding amounts G of the adjacent ribs 23 is less than 0.1 mm, the effects of better contact with the ground and uniformity of the footprint lengths are difficult to achieve due to the difference between the protruding amounts G of the ribs 23 being too small. When the difference between the protruding amounts G of the adjacent ribs 23 exceeds 0.8 mm, the effects of better contact with the ground and uniformity of the footprint lengths are difficult to achieve due to the difference between the protruding amounts G of the ribs 23 being too great. Consequently, when the difference between the protruding amounts G of the adjacent ribs 23 is from 0.01 mm to 0.8 mm, both inclusive, the effects of both steering stability at high speeds and durability at high speeds when a camber is applied can be significantly achieved. Moreover, when a camber is applied, a configuration in which the groove surface area ratio R of the tread surface 21 is greater on the vehicle inner side than the vehicle outer side can suppress the difference in rigidity between the ribs 23 and suppress increases in conicity to a high degree.

In addition, in the pneumatic tire 1 of the present embodiment, the ribs 23 protruding beyond the profile line L are each preferably provided between the circumferential grooves 22.

In other words, as illustrated in FIG. 1, the ribs 23 protruding beyond the profile line L, which are each provided between the circumferential grooves 22, are ribs provided on the inner side in the tire width direction, excluding outermost ribs 23 in the tire width direction (shoulder side ribs). These ribs 23 provided on the inner side in the tire width direction protrude to the outer side in the tire radial direction beyond the profile line L, and the protruding amount G decreases in order from the first side in the tire width direction to the second side. This configuration contributes greatly to achieving the effects of better contact with the ground and uniformity of the footprint lengths. Consequently, the effects of both steering stability at high speeds and durability at high speeds when a camber is applied can be significantly achieved. Moreover, when a camber is applied, a configuration in which the groove surface area ratio R of the tread surface 21 is greater on the vehicle inner side than the vehicle outer side can suppress the difference in rigidity between the ribs 23 and suppress increases in conicity to a high degree.

Examples

FIGS. 6A to 8B are tables showing results of performance testing of pneumatic tires according to working examples of the present technology. In the working examples, various types of pneumatic tires with different conditions were tested for performance relating to steering stability at high speeds (steering stability when travelling at high speeds), durability at high speeds when a camber is applied (durability when travelling at high speeds when a camber is applied), and conicity.

In the tests, pneumatic tires of tire size 295/35R21 were used as the test tires.

The steering stability at high speeds was evaluated using the following method:
the above-described test tires were assembled on 21×10 J rims, inflated to an air pressure of 260 kPa, then mounted to a test vehicle (passenger vehicle with an engine displacement of 4800 cc). Next, the test vehicle was driven on a test course with a dry road surface, and sensory evaluation was carried out by an experienced test driver regarding steering characteristics when changing lanes and cornering and stability when driving straight. The sensory evaluations were expressed as an index with a pneumatic tire of the conventional example as the standard (100). A greater index value indicates superior steering stability.

The durability at high speeds when a camber is applied was evaluated using the following method:
under the conditions that the above-described test tires are assembled on 21×10 J rims and inflated to an air pressure of 340 kPa; a load of 7.65 kN is applied; and a camber angle of −2.7 degrees (the first side corresponding to the vehicle outer side and the second side corresponding to the vehicle inner side when mounted to a vehicle), or a camber angle of +2.7 degrees (the first side corresponding to the vehicle inner side and the second side corresponding to the vehicle outer side when mounted to a vehicle) is applied, the test tires were run on a durability testing drum while proceeding through the speed steps (described below), and the speed at which the test tire failed was measured. The pneumatic tires were evaluated based on how many steps above or below the pneumatic tire of the conventional example the test tire achieved. Here, +1 step means the test tire cleared running for 20 min at +10 km/h, and +0.5 step means the test tire cleared running for 10 min at +10 km/h.

Step 0: running time=0 min, speed=0 km/h
Step 1: running time=1 min, speed=0 to 190 km/h
Step 2: running time=5 min, speed=190 km/h
Step 3: running time=5 min, speed=240 km/h
Step 4: running time=10 min, speed=250 km/h
Step 5: running time=10 min, speed=260 km/h
Step 6: running time=10 min, speed=270 km/h
Step 7: running time=20 min, speed=280 km/h
Step 8: running time=20 min, speed=290 km/h
Step 9: running time=20 min, speed=300 km/h
Step 10: running time=20 min, speed=310 km/h Thereafter, speed was increased by +1 step (+10 km/h, running time of 20 min) until tire failure.

In addition, the conicity was evaluated using the following method:
under the conditions that the above-described test tires are assembled on 21×10 J rims and inflated to an air pressure of 200 kPa; and a load of 6.30 kN is applied, the radial force variation (RFV), which is a balance in rigidity in the longitudinal direction, was measured using a force variation machine based on stipulations of Japanese Automotive Standards Organization (JASO) C607. Furthermore, the average value of the lateral force exerted in the tire axial direction was measured. The results were expressed as an index with a conventional example of pneumatic tire as the standard (100). A greater index value indicates superior conicity.

The rib configuration illustrated in FIG. 1 was used for the examples indicated in FIGS. 6A-6B and FIGS. 7A-7B. Here, the outermost rib in the tire width direction corresponds to a first side outer rib, a rib adjacent to the first side outer rib on the inner side in the tire width direction corresponds to a first side inner rib, a rib disposed at the tire equatorial plane adjacent to the first side inner rib on the inner side in the tire width direction corresponds to a tire equatorial plane rib, a rib adjacent to the tire equatorial plane rib disposed on the second side corresponds to the second side inner rib, and the outermost rib adjacent to the second side inner rib on the outer side in the tire width direction corresponds to a second side outer rib.

The pneumatic tire of Conventional Example 1 indicated in FIGS. 6A-6B and FIGS. 7A-7B has no protruding ribs. The pneumatic tire of Comparative Example 1 has a protruding rib only at the tire equatorial plane. The pneumatic tires of Working Examples 1 to 20 indicated in FIGS. 6A-6B and FIGS. 7A-7B have at least two ribs that protrude to the outer side in the tire radial direction beyond the profile line of the tread surface when viewed in the tire meridian cross-section. The protruding amount decreases in order from the first side in the tire width direction to the second side. The groove surface area ratio of the tread surface is greater on the second side in the tire width direction of the tire equatorial plane than the first side. In addition, the pneumatic tires of Working Example 8 and Working Example 10 to Working Example 20 have ribs with a protruding amount of from 0.05 mm to 2.0 mm, both inclusive. The pneumatic tires of Working Example 11 and Working Example 16 to Working Example 20 have a difference between protruding amounts of the adjacent ribs of from 0.1 mm to 0.8 mm, both inclusive. The pneumatic tires of Working Example 1 to Working Example 3, and Working Example 9 to Working Example 20 have ribs that protrude beyond the profile line disposed between circumferential grooves. The pneumatic tires of Working Example 11 and Working Example 14 to Working Example 20 include the side having the rib with the larger protruding amount which has a groove surface area ratio Ra of from 0.20 to 0.30, both inclusive, and the side having the rib with the smaller protruding amount which has a groove surface area ratio Rb of from 0.25 to 0.40, both inclusive; and the groove surface area ratios Ra, Rb satisfy the relationship Ra<Rb.

The rib configuration illustrated in FIG. 2 was used for the examples indicated in FIGS. 8A-8B. Here, the outermost rib in the tire width direction corresponds to a first side outer rib, a rib adjacent to the first side outer rib on the inner side in the tire width direction corresponds to a first side inner rib, a rib adjacent to the first side inner rib disposed on the second side corresponds to a second side inner rib, and the outermost rib adjacent to the second side inner rib on the outer side in the tire width direction corresponds to a second side outer rib.

The pneumatic tire of Conventional Example 2 indicated in FIGS. 8A-8B has no protruding ribs. The pneumatic tire of Comparative Example 2 only has the first side inner rib as a protruding rib. The pneumatic tires of Working Examples 21 to 33 indicated in FIGS. 8A-8B have at least two ribs that protrude to the outer side in the tire radial direction beyond the profile line of the tread surface when viewed in the tire meridian cross-section. The protruding amount decreases in order from the first side in the tire width direction to the second side. The groove surface area ratio of the tread surface is greater on the second side in the tire width direction of the tire equatorial plane than the first side. In addition, the pneumatic tires of Working Example 25 and Working Example 27 to Working Example 33 have ribs with a protruding amount of from 0.05 mm to 2.0 mm, both inclusive. The pneumatic tires of Working Example 29 to Working Example 33 have a difference between protruding amounts of the adjacent ribs of from 0.1 mm to 0.8 mm, both inclusive. The pneumatic tires of Working Example 21 and Working Example 26 to Working Example 33 have ribs that protrude beyond the profile line disposed between circumferential grooves. The pneumatic tires of Working Example 29 and Working Example 31 to Working Example 33 include the side having the rib with the larger protruding amount which has a groove surface area ratio Ra of from 0.20 to 0.30, both inclusive, and the side having the rib with the smaller protruding amount which has a groove surface area ratio Rb of from 0.25 to 0.40, both inclusive; and the groove surface area ratios Ra, Rb satisfy the relationship Ra<Rb.

As is seen by the performance results shown in FIGS. 6A-6B and FIGS. 7A-7B, the pneumatic tires of Working Example 1 to Working Example 33 had enhanced steering stability at high speeds and durability at high speeds when a camber is applied, and suppressed increases in conicity.

The invention claimed is:

1. A pneumatic tire comprising:
    at least three circumferential grooves extending in a tire circumferential direction in a tread portion; and
    at least four ribs defined by the at least three circumferential grooves, the at least four ribs extending in the tire circumferential direction; wherein
    at least two of the ribs adjacent to each other and including the rib disposed on a first side of a tire equatorial plane in a tire width direction and the rib disposed on a second side protrude to an outer side in a tire radial direction beyond a profile line of a tread surface when viewed in a meridian cross section;
    the protruding amount decreases in order from the first side in the tire width direction to the second side;
    a groove surface area ratio of the tread surface is greater on the second side of the tire equatorial plane in the tire width direction than on the first side; and
    the ribs protruding beyond the profile line are provided adjacent to one another interposed by one of the circumferential grooves, and a difference between the protruding amounts of the adjacent ribs is from 0.4 mm to 0.8 mm, both inclusive.

2. The pneumatic tire according to claim 1, wherein the protruding amount beyond the profile line of the ribs is from 0.05 mm to 2.0 mm, both inclusive.

3. The pneumatic tire according to claim 1, wherein the groove surface area ratio Ra on the side on which the rib has the larger protruding amount is from 0.20 to 0.30, both inclusive; the groove surface area ratio Rb on the side on which the rib has the smaller protruding amount is from 0.25 to 0.40, both inclusive; and the groove surface area ratios Ra, Rb satisfy the relationship Ra<Rb.

4. The pneumatic tire according to claim 1, wherein a vehicle inner/outer side orientation when mounted to a vehicle is designated, the protruding amount of the ribs decreases in order from the vehicle outer side to the vehicle inner side, and the groove surface area ratio of the tread surface is greater on the vehicle inner side than the vehicle outer side.

5. The pneumatic tire according to claim 1, wherein the ribs protruding beyond the profile line are each provided between the circumferential grooves.

6. The pneumatic tire according to claim 2, wherein the groove surface area ratio Ra on the side on which the rib has the larger protruding amount is from 0.20 to 0.30, both inclusive; the groove surface area ratio Rb on the side on which the rib has the smaller protruding amount is from 0.25 to 0.40, both inclusive; and the groove surface area ratios Ra, Rb satisfy the relationship Ra<Rb.

7. The pneumatic tire according to claim 6, wherein a vehicle inner/outer side orientation when mounted to a vehicle is designated, the protruding amount of the ribs decreases in order from the vehicle outer side to the vehicle inner side, and the groove surface area ratio of the tread surface is greater on the vehicle inner side than the vehicle outer side.

8. The pneumatic tire according to claim 1, wherein the ribs protruding beyond the profile line are each provided between the circumferential grooves.

9. The pneumatic tire according to claim 1, wherein three of the adjacent ribs protrude to the outer side in the tire radial direction beyond the profile line of the tread surface and the protruding amount of the three adjacent ribs decreases in order from the first side in the tire width direction to the second side.

10. The pneumatic tire according to claim 1, wherein all of the ribs protrude to the outer side in the tire radial direction beyond the profile line of the tread surface and the protruding amount of the all ribs decreases in order from the first side in the tire width direction to the second side.

11. The pneumatic tire according to claim 1, wherein one of the circumferential grooves is disposed on the tire equatorial plane.

* * * * *